(12) United States Patent
Ishimoto

(10) Patent No.: US 7,733,749 B2
(45) Date of Patent: Jun. 8, 2010

(54) BEAM SPOT POSITION CONTROL DEVICE AND BEAM SPOT POSITION CONTROL METHOD, AND OPTICAL DISK RECORDING AND REPRODUCING DEVICE

(75) Inventor: Tsutomu Ishimoto, Tokyo (JP)

(73) Assignee: Sony Corporation, Tokyo (JP)

( * ) Notice: Subject to any disclaimer, the term of this patent is extended or adjusted under 35 U.S.C. 154(b) by 737 days.

(21) Appl. No.: 11/712,867

(22) Filed: Mar. 1, 2007

(65) Prior Publication Data
US 2007/0206462 A1 Sep. 6, 2007

(30) Foreign Application Priority Data
Mar. 3, 2006 (JP) ............... 2006-058268

(51) Int. Cl.
*G11B 7/00* (2006.01)
(52) U.S. Cl. .............. 369/44.37; 369/44.32; 369/53.28; 369/112.03
(58) Field of Classification Search ........................ None
See application file for complete search history.

(56) References Cited

U.S. PATENT DOCUMENTS

| 5,892,744 | A | * | 4/1999 | Ohba | 369/44.37 |
| 6,567,355 | B2 | * | 5/2003 | Izumi et al. | 369/44.41 |
| 2002/0054547 | A1 | * | 5/2002 | Fujinoki et al. | 369/44.23 |
| 2005/0122862 | A1 | * | 6/2005 | Shin et al. | 369/44.41 |
| 2005/0128923 | A1 | * | 6/2005 | Shin et al. | 369/112.15 |

FOREIGN PATENT DOCUMENTS

| JP | 3 22227 | 1/1991 |
| JP | 5 20699 | 1/1993 |
| JP | 2001 357550 | 12/2001 |

* cited by examiner

*Primary Examiner*—Paul Huber
(74) *Attorney, Agent, or Firm*—Frommer Lawrence & Haug LLP; William S. Frommer; Thomas F. Presson

(57) ABSTRACT

A beam spot position control device, for controlling multiple beam spot positions irradiated onto an optical recording medium so as to be disposed linearly, includes a light detecting unit for detecting the amount of return light for each of a plurality of beam spots disposed linearly, a tracking control unit for performing tracking control based on tracking error signals of at least one of the beam spots detected with the optical detecting unit, and a rotation control unit for rotating the plurality of beam spots which are disposed linearly, based on the DC offset amount of the tracking error signals of at least two of the beam spots detected with the optical detecting unit.

18 Claims, 8 Drawing Sheets

TRACK CENTER

TRACK CENTER

TRACK CENTER

TRACK CENTER

TRACK CENTER

TRACK CENTER $TESb = \alpha a - \beta a > 0$
$TESb = \alpha b - \beta b < 0$
$TE = TESa + TESb = 0$ $TESa = 0$
$TESb = 0$ TESb = αb - βb = 0

TESb = αb - βb < 0

BEAM SPOT POSITION CONTROL DEVICE AND BEAM SPOT POSITION CONTROL METHOD, AND OPTICAL DISK RECORDING AND REPRODUCING DEVICE

CROSS REFERENCES TO RELATED APPLICATIONS

The present invention contains subject matter related to Japanese Patent Application JP 2006-058268 filed in the Japanese Patent Office on Mar. 3, 2006, the entire contents of which are incorporated herein by reference.

BACKGROUND OF THE INVENTION

1. Field of the Invention

The present invention relates to a beam spot position control device and beam spot position control method, and an optical disk recording and reproducing device for irradiating multiple beam spots onto a disk-shaped recording medium and for recording and reproducing information.

2. Description of the Related Art

An optical disk recording and reproducing device normally irradiates a single spot of light which has been collected by an objective lens onto an information track formed beforehand on an optical disk, and performs signal recording and signal reproducing. The information track normally is formed in a spiral shape from the innermost portion of the optical disk towards the outer side, or from the outermost portion towards the inner side, and therefore by the optical disk recording and reproducing device performing tracking control to the track, the signals are written or read sequentially.

SUMMARY OF THE INVENTION

As a known method for improving the information transfer rate of reading and writing of an optical disk, there is a method for increasing the rotation speed of the disk, but an increased rotation of the optical disk requires a widening the range of focal point control or tracking control, and due to limitations of frequency properties of an actuator or the like, simply widening the ranges thereof is difficult.

Also, as a method for improving the information transfer rate of an optical disk reproducing device, other than a method for increasing the disk rotation speed, there is a method for reading multiple track information in parallel with a multi-beam arrangement wherein multiple beams irradiate light simultaneously, but in the case of an optical disk which is assumed to be removable, there is a problem wherein the relative positions of the multi-beam spots are fixed. For example, the curvature radius differs for the inner circumference and the outer circumference, and therefore even if the beam spot position is optimized so as to trace the pits or recording marks at the inner circumference, each beam spot may not appropriately trace the pits or recording marks.

For example, as shown in FIG. 8A, in the case that the multi-beam positions are adjusted so that spots a and b evenly irradiate light as to the pit row or groove at an arbitrary radius, if the returning light amount from the spot a is halved and this is taken as $\alpha a$ and $\beta a$, for example, a tracking error signal (TESa) by push-pull method is as the following Expression 1.

$$TESa = \alpha a - \beta a \qquad (1)$$

Also, similarly, with the returning light amount from the spot b as $\alpha b$ and $\beta b$, a tracking error signal (TESb) by push-pull method is as the following Expression 2.

$$TESb = \alpha b - \beta b \qquad (2)$$

In the case of the state shown in FIG. 8A, the spot a and the spot b both irradiate light equally to the pit row or groove, and so each becomes as follows.

$$TESa = 0 \qquad (3)$$

$$TESb = 0 \qquad (4)$$

However, in the case that the relative positions of the beam remain in the state shown in FIG. 8A, but the beam shifts to the external circumference of the disk which has a greater curved radius than the inner circumference thereof, the state thereof becomes such as that shown in FIG. 8B for example, so even if the spot a is on track, the spot b de-tracks. That is to say, from the Expression (1) and Expression (2), the tracking error signals of (TESa) and (TESb) are as follows.

$$TESa = 0 \qquad (5)$$

$$TESb \neq 0 \qquad (6)$$

Accordingly, the producing signal quality decreases being in a de-tracked state, causing increased jittering or increased error rates, and so stable reproducing becomes difficult.

Japanese Unexamined Patent Application Publication No. 3-22227 describes a technology for rotating an optical head of a multi-beam as to the difference of the curved radius of the inner circumference and outer circumference of a desk as described above, and irradiating a beam spot at each information track of the optical disk. With the technology described in this Japanese Unexamined Patent Application Publication No. 3-22227, of two beam spots, one beam spot is subjected to tracking control, and the other beam spot is in an on-track state due to the rotation of the optical head, but because rotation control is performed based on one beam spot, this has led to a great increase in jittering or a great increase in the error rate.

There has been recognized a need to address the above-mentioned problems. According to an embodiment of the present invention, there is provided a beam spot position control device and beam spot position control method, and an optical disk recording and reproducing device, wherein multiple beam spots can be in an on-track state with a high degree of precision.

An embodiment of the present invention can be arranged so as to have multiple beam spots in an on-track state with a high degree of precision, by detecting the returning light amount for each of multiple beam spots disposed linearly, performing tracking control based on the tracking error signal of at least one of the detected beam spots, and rotating the multiple beam spots disposed linearly, based on the difference in the tracking error signals of at least two of the detected beam spots.

DESCRIPTION OF THE PREFERRED EMBODIMENTS

Specific embodiments of the present invention will be described in detail with reference to the diagrams.

Figure 1:
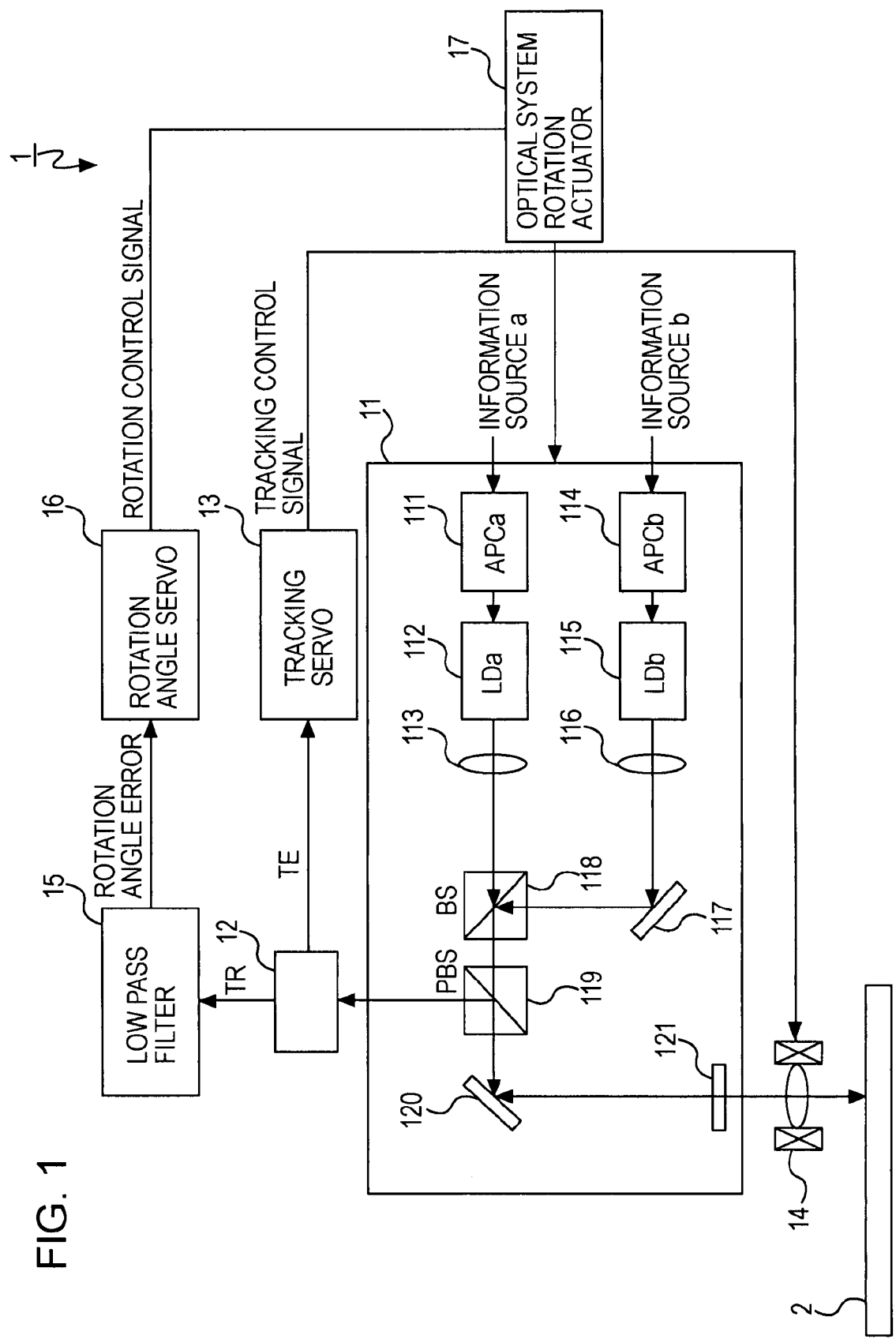
FIG. 1 is a process block diagram of an optical disk recording and reproducing device at the time of recording with application of the present invention.

FIG. 1 is a process block diagram of an optical disk recording and reproducing device 1, to which the present invention has been applied, at the time of recording. Note that here, an arrangement is described using two beam spots, but the present invention is not limited to this, and a greater number of beam spots may be used.

The optical disk recording and reproducing device 1 comprises an optical system 11 for generating two beam spots which are disposed linearly on an optical disk 2, a light-receiving unit 12 for receiving the reflected light of the beam spots from the optical disk 2, a tracking servo 13 for performing tracking based on a TE signal output from the light receiving unit 12, a tracking actuator 14 for moving the position of the beam spots irradiated onto the optical disk 2, based on the tracking control signals output from the tracking servo 13, a low pass filter 15 for generating rotation angle error signals from a TR signal output from the light receiving unit 12, a rotation angle servo 16 for performing rotation control of the optical system 11, based on the rotation angle error signals, and an optical system rotation actuator 17 for rotating the optical system 11 based on the rotation angle control signal output from the rotation angle servo 16 and changes the relative positioning angle of the beam spots.

The optical system 11 further comprises a first APC (Automatic Power Control) a111 for controlling laser output according to an information source a of the light signals, a first LD (Laser Diode) a112 for generating laser light, a first collimator lens a113, a second APC b114 for controlling laser output according to the information source b of the light signals, a second LD b115 for generating laser light, a second collimator lens b116, a mirror 117 for guiding the laser light from the second LD b115 to a BS 118, a BS (Beam Splitter) 118 for guiding laser light from the LD a112 and LD b115 along the same axis, a PBS (Polarized Beam Splitter) 119 for separating incident light and reflected light, a mirror 120, and a ¼ wavelength plate 121 for incident circularly-polarized light.

The emitted light from the first LD a112 of the light source becomes parallel light with the first collimator lens 113, and is parallel with the emitted light from the second LD b115 with the BS 118. The emitted light from the first LD a112 and second LD b115 is transmitted through a PBS 119, and is guided by a mirror to a ¼ wavelength plate 121. The linearly polarized light from the first LD a112 and second LD b115 which is guided to the ¼ wavelength plate 121 is changed into circularly polarized light, and is cast upon the optical disk 2 via the objective lens. Also, the reflected light from the optical disk 2 is guided to the light receiving unit 12 for detecting tracking errors and so forth, following being reflected at the PBS 119.

The light receiving unit 12 includes a PD (Photo Diode) as to each beam spot. For example, each PD uses a push-pull method (PP) to generate a tracking error signal from the light amount difference occurring from the positional relation between the spot irradiated on the optical disk 2 and the guide groove. Also, the light receiving unit 12 calculates a tracking signal TE and a tracking signal TR based on the tracking error signal as will be described later.

The tracking servo 13 generates a tracking control signal based on the tracking signal TE calculated at the light receiving unit 12, to control the tracking actuator 14. The tracking actuator 14 moves the objective lens based on the tracking control signal so as to cause the beam spot to be in an on-track state.

Also, the tracking signal TR calculated at the light receiving unit 12 is subjected to removal of high-frequency components by the low pass filter 15, and becomes a rotation angle error signal. For example, in the case that the diffracted light center does not match the bisected detector center, fluctuations occur to the DC components of the tracking signal TR, as will be described later, and the rotation angle error signal is generated.

The rotation angle servo 16 generates a rotation control signal based on the rotation angle error signal output from the low pass filter 15 to control the optical system rotation actuator 17. The optical rotation actuator 17 rotates the optical system 11 based on the rotation control signal, causing the multiple beam spots which are disposed linearly to be in an on-track state.

Figure 2:
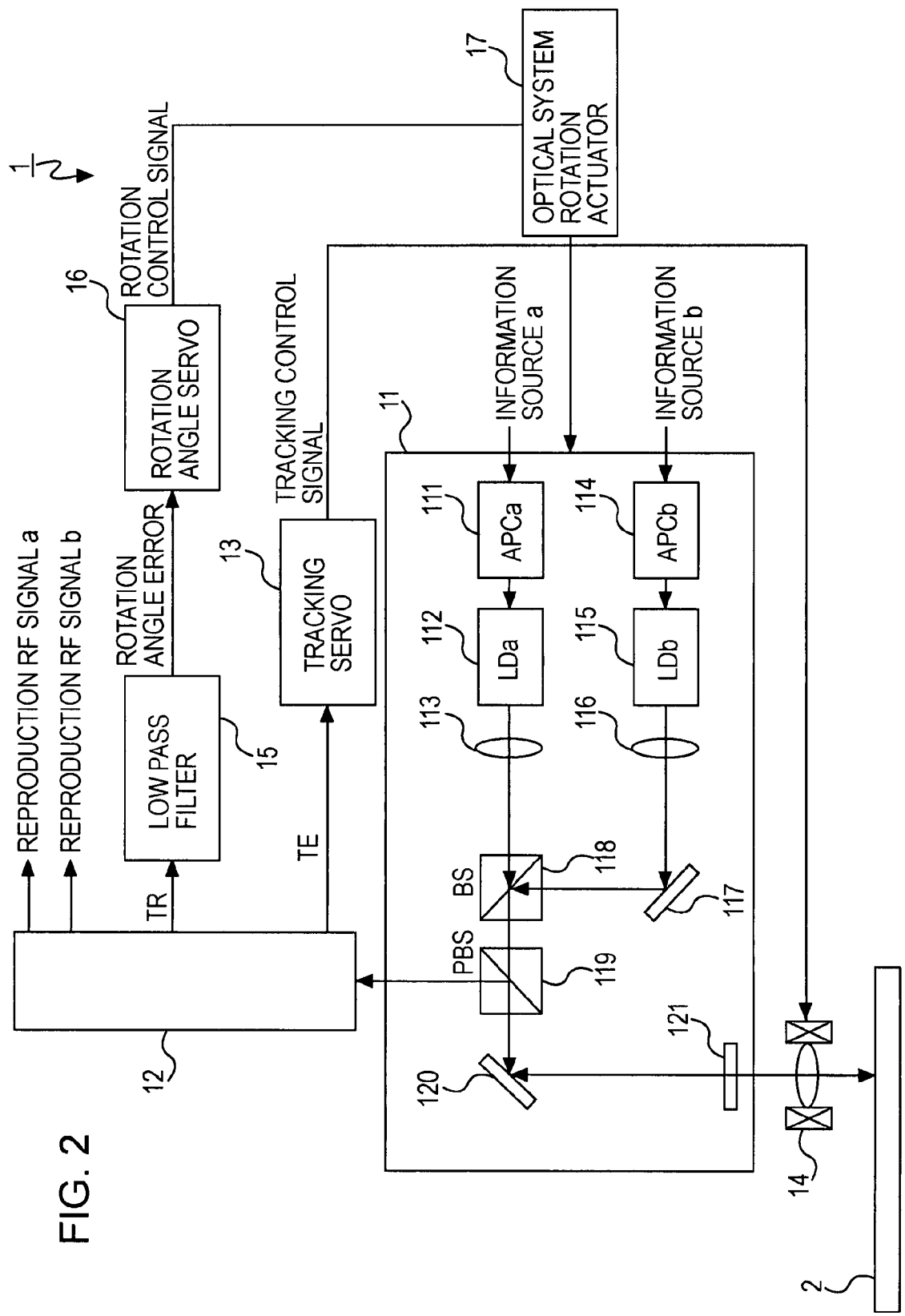
FIG. 2 is a process block diagram of an optical disk recording and reproducing device at the time of reproducing with application of the present invention.

FIG. 2 is a process block diagram of the above-described optical disk recording and reproducing device 1 at the time of reproducing. At the time of reproducing, processing is performed with a similar configuration to that of the above-described time of recording. That is to say, the emitted light from the first LD a112 of the light source becomes parallel light with the first collimator lens 113, and is parallel with the emitted light from the second LD b115 with the BS 118. The emitted light from the first LD a112 and second LD b115 is transmitted through a PBS 119, and is guided by a mirror to a ¼ wavelength plate 121. The linearly polarized light from the first LD a112 and second LD b115 which is guided to the ¼ wavelength plate 121 is changed into circularly polarized light, and is cast upon the information track on the optical disk 2 via the objective lens.

Also, the reflected light from the optical disk 2, following being reflected at the PBS 119, is guided to the light receiving unit 12 for detecting tracking errors, focus error, reproducing RF signals and so forth, and reproducing RF signal a and a reproducing RF signal b is output from the light receiving unit 12.

Also, optical disk recording and reproducing device 1 at the time of reproducing is similar to that at the time of recording as described above in that the objective lens is moved based on the tracking signal TE, tracking is performed, and multiple beam spots disposed linearly are caused to be in an on-track state based on the tracking signal TR.

Next, the tracking signal TE and tracking signal TR generated at the light receiving unit 12 will be described. FIG. 3 is a schematic diagram illustrating an example of a state of two beam spots being irradiated onto a track. The returning light amount from the one spot a is split into two parts, $\alpha a$ and $\beta a$, and similarly, with the returning light amount from the other spot b as $\alpha b$ and $\beta b$, for example the tracking error signal with the push-pull method will be as in the following Expression (7) and Expression (8).

$$TESa = \alpha a - \beta a \quad (7)$$

$$TESb = \alpha b - \beta b \quad (8)$$

Figure 3A:
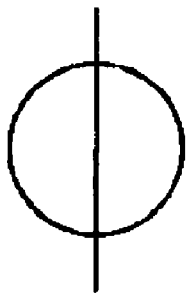
FIGS. 3A through 3C are schematic diagrams illustrating an example of a state of two beam spots being irradiated onto a track.
Figure 3A:
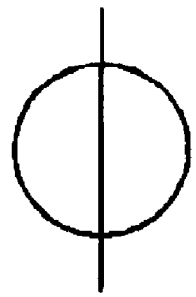

In the case that the irradiated light of the two beam spots are the same state as that in FIG. 3A, the beam spots are equally irradiated onto the pit row or group, thus TESa=0, and TESb=0.

Figure 3B:
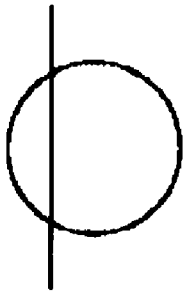
Figure 3B:
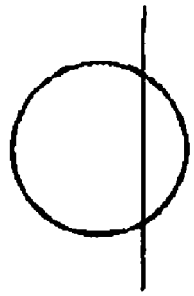
Figure 3C:
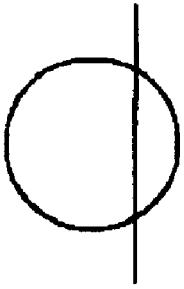
Figure 3C:
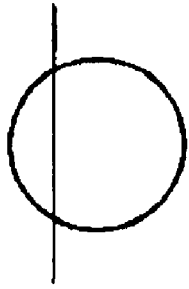

In the case that the irradiated light of the two beam spots are the same state as that in FIG. 3B, the beam spots are not equally irradiated onto the pit row or group, thus TESa<0 and TESb>0, and in the state of FIG. 3C, TESa>0 and TESb<0.

Thus, the tracking signal TE and tracking signal TR are each defined in the following Expression (9) and Expression (10).

$$TE = TESa + TESb \qquad (9)$$

$$TR = TESa - TESb \qquad (10)$$

In this case, when the irradiating light of the beam spot is in the state of FIG. 3A, TE=0 and TR=0. Also, when the irradiating light of the beam spot is in the state of FIG. 3B and FIG. 3C, when TE is 0, TR becomes TR<0 and TR>0, respectively. That is to say, by performing tracking control so that TE becomes 0 and by subjecting the multiple beam spots disposed linearly to rotation control so that the tracking signal TR, the multiple beam spots can be in an on-track state accurately.

Figure 4:
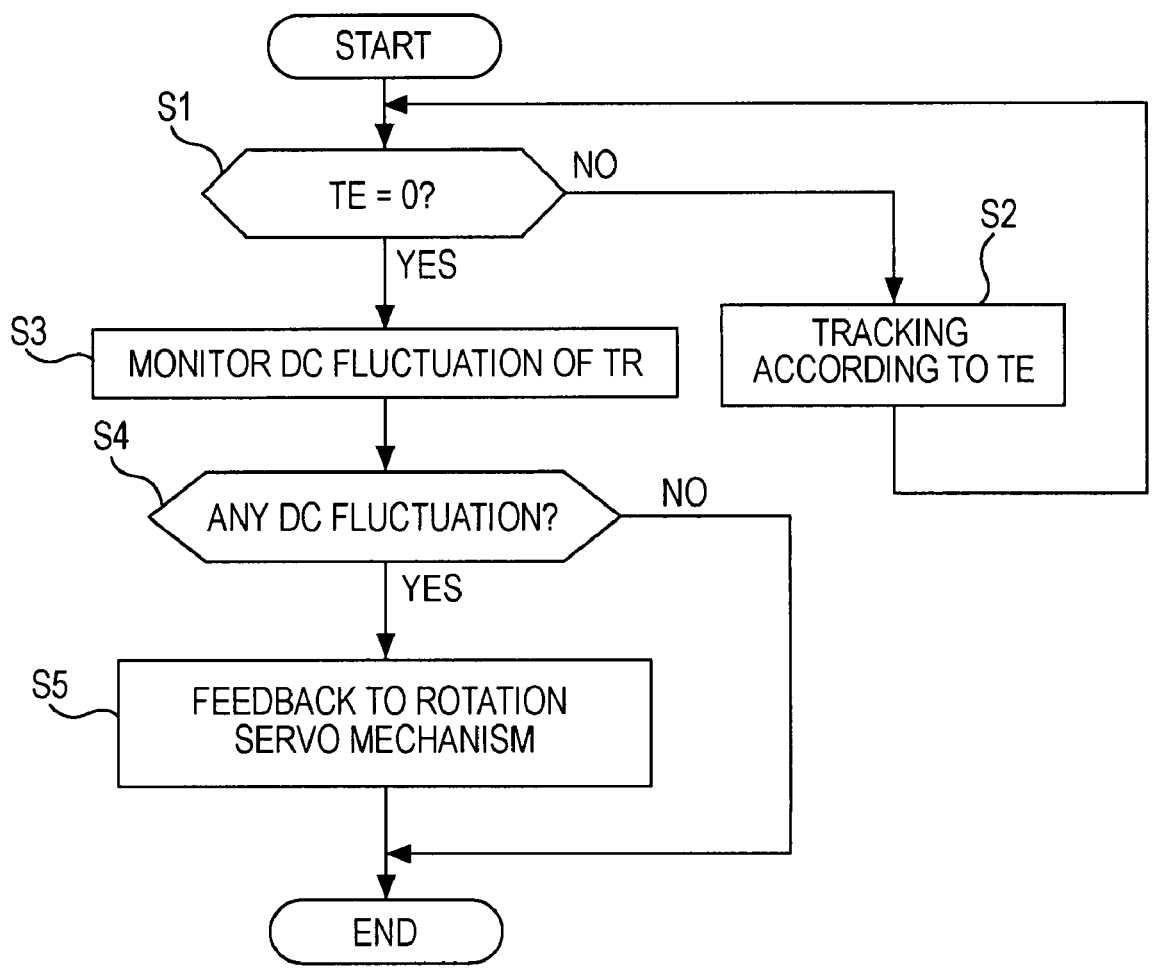
FIG. 4 is a flowchart of the operations for controlling multiple beam spot positions.

Next, the control operations of the positions of the multiple beam spots disposed linearly will be described with reference to the flowchart in FIG. 4.

First, a reference radius, for example multiple beam spot positions disposed linearly in a TOC (Table of Contents) area wherein the optical disk recording and reproducing device 1 first reads in, is said to be adjusted.

In step S1, the tracking servo 13 determines whether or not the tracking signal TE is 0 or not. In the case that the tracking signal TE is not 0, the flow advances to step S2, and the tracking actuator 14 is driven so that the tracking signal TE becomes 0. Also, if the tracking signal TE is 0, the flow advances to step S3.

In step S3, the DC fluctuations of the low-frequency DC components of the tracking signal TR is monitored.

In step S4, the rotation angle servo 16 determines whether or not DC fluctuations occur at the tracking signal TR monitored in step S3. If DC fluctuations occur in step S4, i.e. in the case that the tracking signal TR input into the rotation angle servo 16 is at a level higher than a given threshold value, the optical system rotation actuator 17 is rotationally driven based on the DC offset amount thereof, and the rotation angle servo 16 controls the relative position angles of the multiple beam spots disposed linearly (step S5). Also, in the case that there is no DC fluctuation occurring in step S4, i.e., in the case that all of the beam spots are in an on-track state, the control operations of the beam spot positions is ended.

When the spot positions irradiating the information tracks of the optical disk 2 are moved from the inner circumference to the outer circumference, a tracking servo is not simply performed, but rather the DC fluctuation amount of the tracking signal TR generated when moving the radius is said to be the rotation error, and feedback is provided to the rotation servo mechanism rather than feedback being provided to the tracking servo mechanism.

Figure 5A:
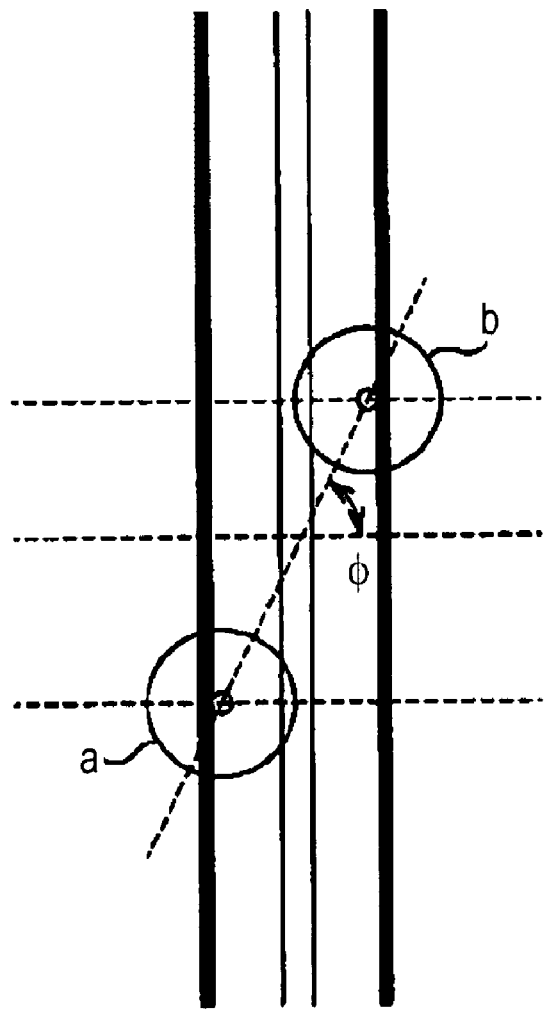
FIGS. 5A and 5B are schematic diagrams for describing control of the multiple beam spot positions.
Figure 5B:
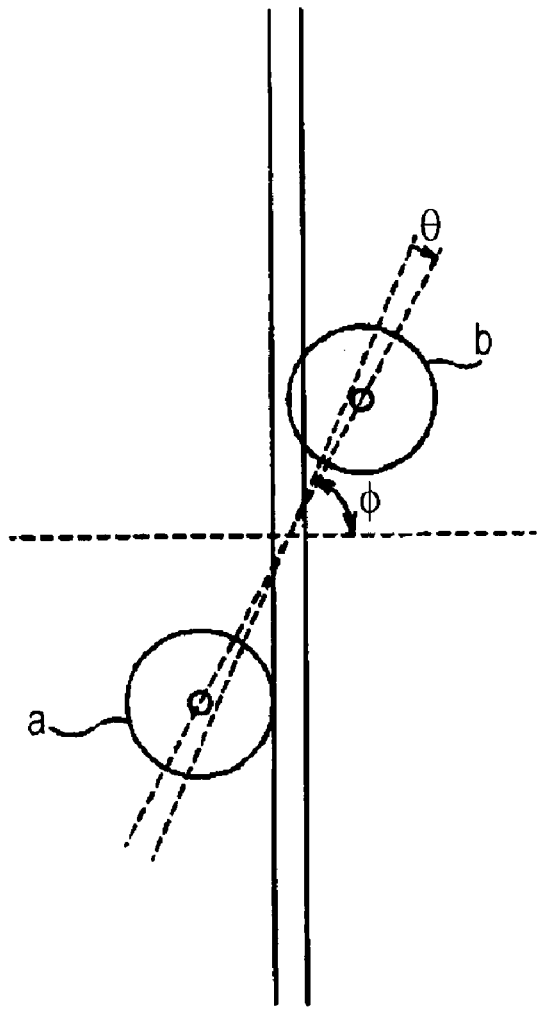

Thus, for example, the tracking signal TE is 0 as shown in FIG. 5A, and even in the case wherein the spot A and spot B are in a de-tracked state, each beam spot can be made to pass through on the center of the track, by varying the relative position angles φ of the multiple spots disposed linearly by a θ amount according to the DC offset amount of the tracking signal TR, as shown in FIG. 5B.

Note that with the above-described embodiment, using a push-pull method is described as a tracking error detecting method, but the present invention is not limited to this, and a 3-spot method or a DPP method or the like may be used. Also, description is given for performing tracking control based on the tracking signal TE, but the present invention is not limited to this, and for example, tracking control may be performed based on TESa or TESb, to perform rotation control of the relative positions of the multiple beam spots disposed linearly based on the tracking signal TR.

Also, as a method for rotating the linearly disposed beam spots, the above embodiment describes rotating an optical system 11, but the present invention is not limited to this, and in the case of using multiple lasers, the laser device may be rotated, or in the case of performing beam splitting as to one beam with grating to use multiple beam spots, the grating may be rotated.

Figure 6:
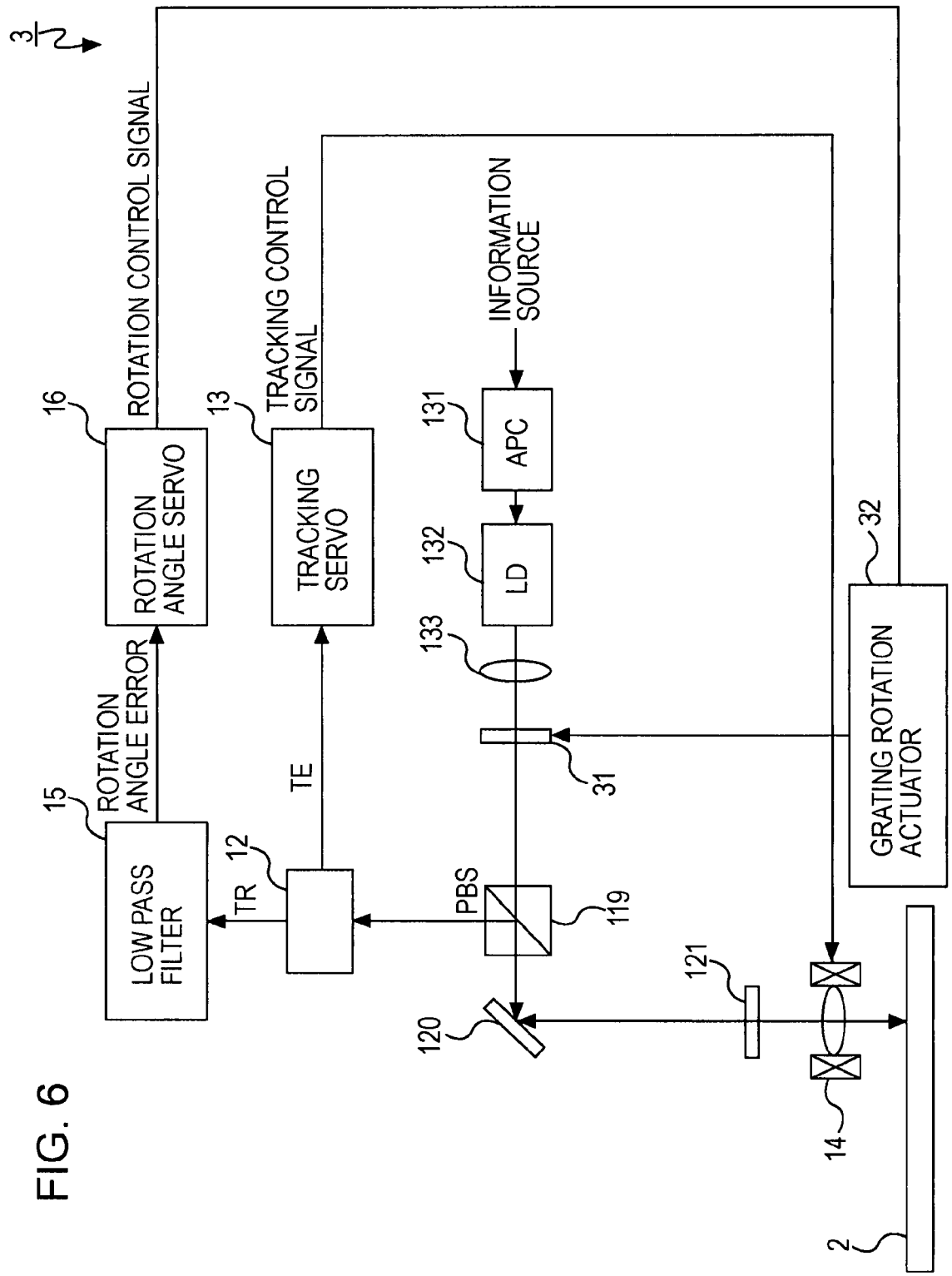
FIG. 6 is a process block diagram of an optical disk recording and reproducing device at the time of recording with application of the present invention.

FIG. 6 is a block diagram illustrating a configuration example of an optical disk recording and reproducing device for rotating multiple beam spots disposed linearly. Note that configurations similar to those of the optical disk recording and reproducing device 1 of the above-described embodiment are denoted with the same reference numerals, and the description thereof will be omitted here.

The optical disk recording and reproducing device 3 comprises an APC (Automatic Power Control) 131 for controlling laser output according to the information source of the light signal, an LD (Laser diode) 132 for generating laser light, a collimator lens 133, a grating 31 which splits beams, a PBS (Polarized Beam Splitter) 119 for separating incident light and reflected light, a mirror 120, a ¼ wavelength plate 121 causing circularly polarized incident light, a light receiving unit 12 for receiving the reflected light from the optical disk 2, a tracking servo 13 for performing tracking based on the TE signal output from the light receiving unit 12, the tracking actuator 14 for moving the beam spots irradiated onto the optical disk based on the tracking control signal output from the tracking servo 13, a low pass filter 15 for generating a rotation angle error signal from the DC offset amount of the TR signal output from the light receiving unit 12, a rotation angle servo 16 for subjecting the grating 31 to rotation control based on the rotation angle error signal, and a grating rotation actuator 32 for rotating the grating 31 based on the rotation angle control signal output from the rotation angle servo 16 and varying the relative position angles of the beam spots.

The light emitted from the LD 132 of the light source becomes parallel light with the collimator lens 133, and the beam is split with the grating 31. The beams which are split with the grating 31 are transmitted through the PBS 119, and are guided by a mirror to the ¼ wavelength plate 121. The linearly-polarized light of the LD 132 guided to the ¼ wavelength plate 121 is converted to circularly-polarized light, and is cast upon the optical disk 2 via an objective lens such as a high-NA SIL (Solid Immersion Lens) or the like. Also, the reflected light from the optical disk 2 is guided to the light receiving unit 12 for detecting a tracking error or the like, after being reflected at the PBS 119. Note that the optical disk recording and reproducing device 1 is similar to that at the time of recording as described in the above embodiment in that the objective lens is moved based on the tracking signal TE, tracking is performed, and multiple beam spots disposed linearly based on the DC offset amount of the tracking signal TR are caused to be in an on-track state.

Figure 7:
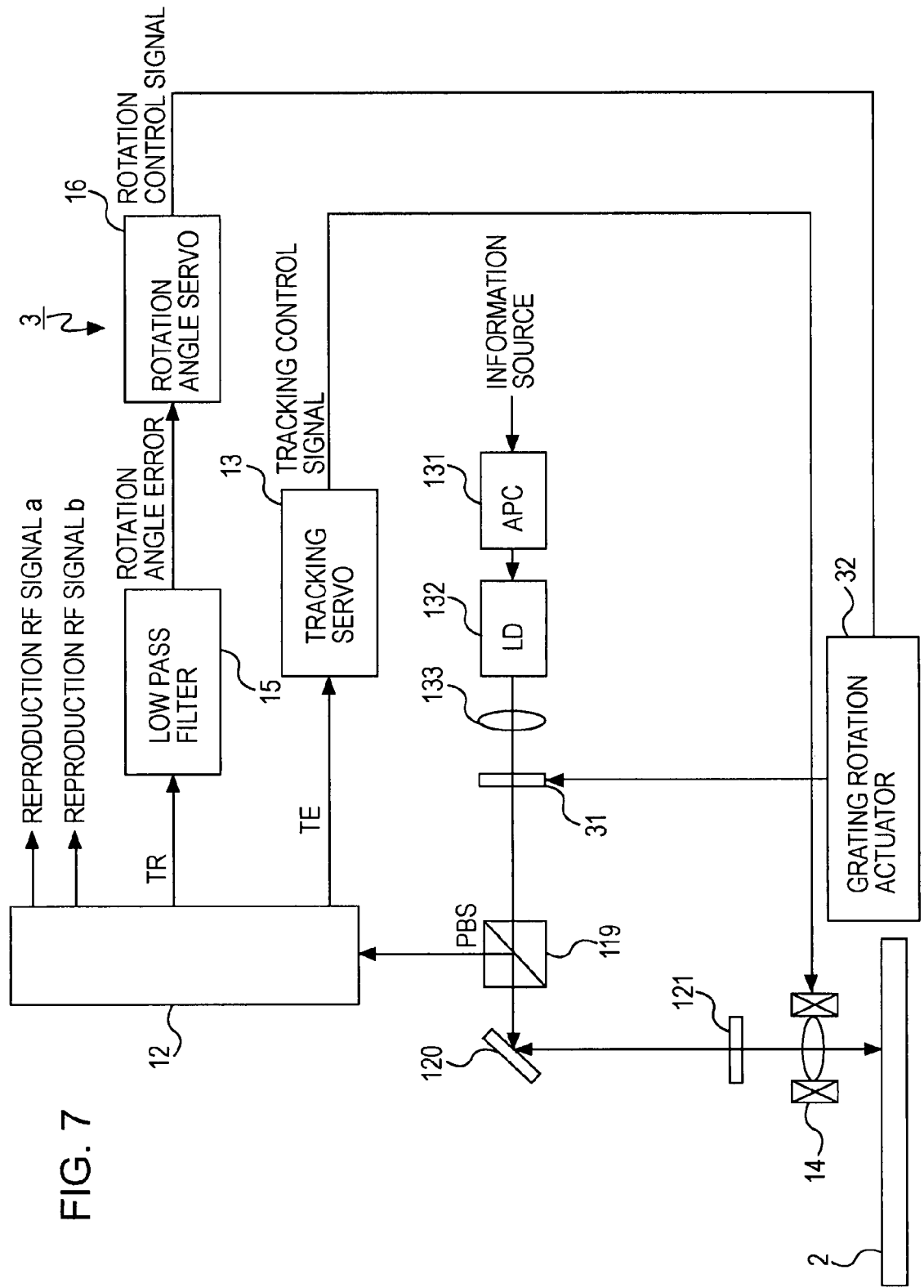
FIG. 7 is a process block diagram of an optical disk recording and reproducing device at the time of reproducing with application of the present invention.
Figure 8A:
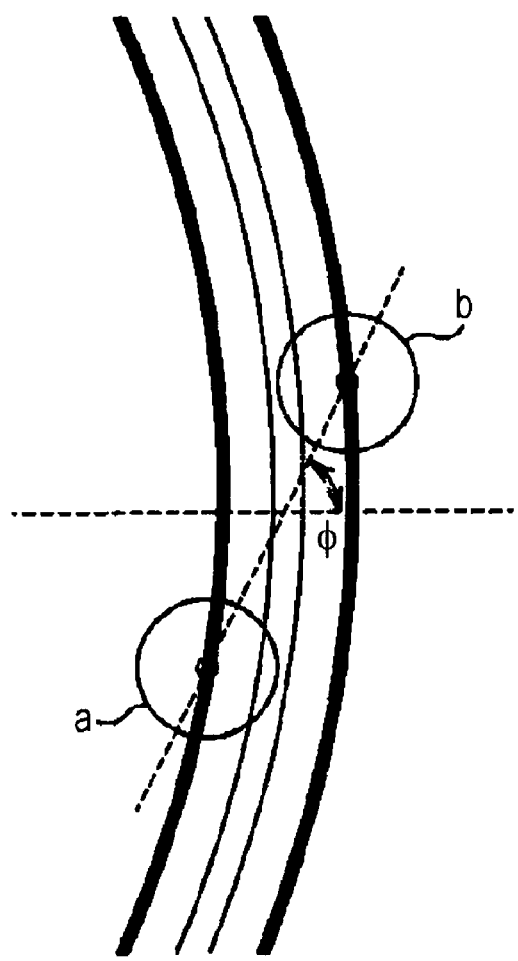
FIGS. 8A and 8B are schematic diagrams for describing conventional control of beam spot positions.
Figure 8B:
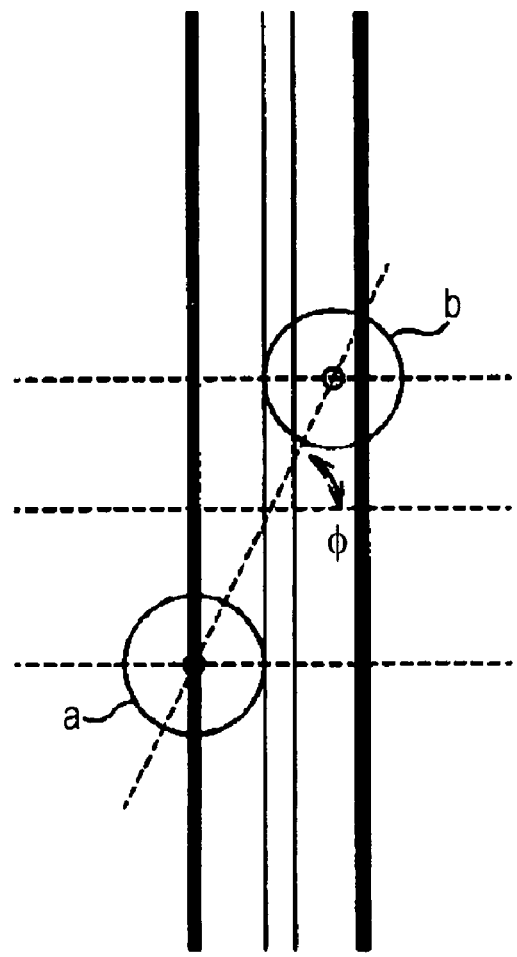

Also, FIG. 7 is a process block diagram of an optical disk recording and reproducing device 3 at the time of reproducing, having a grating. Processing is performed at the time of reproducing with similar configurations to that of the above-described time of recording. That is to say, the light emitted from the LD 132 of the light source becomes parallel light with the collimator lens 133, and the beam is split with the grating 31. The beams which are split with the grating 31 are transmitted through the PBS 119, are guided by a mirror to the ¼ wavelength plate 121, the LD 132 linearly-polarized light is converted to circularly-polarized light, and is cast upon the multiple information tracks of the optical disk 2 via an objective lens such as a high-NA SIL or the like.

Also, following being reflected at the PBS 119, the reflecting light from the optical disk 2 is guided to the light receiving unit 12 for detecting tracking errors, focus errors, reproducing RF signals, and so forth, and a reproducing RF signal A and a reproducing RF signal B is output from the light receiving unit 12. Note that the optical disk recording and reproducing device 3 at time of reproducing is similar to that at the time of recording as described above in that the objective lens is moved based on the tracking signal TE, tracking is performed, and multiple beam spots disposed linearly based on the DC offset amount of the tracking signal TR are caused to be in an on-track state.

Thus, the rotation angle error is detected with the DC components of the tracking signal TR, and by rotating the optical system or the grating, the multi-spots can be tracked to multiple grooves or pits. In other words, the relative position angles of the multiple beam spots which are linearly disposed can be automatically changed according to the optical disk curved radius, and therefore reproducing signal quality can be improved, and a stabilized reproducing signal can be obtained.

It should be understood by those skilled in the art that various modifications, combinations, sub-combinations and alterations may occur depending on design requirements and other factors insofar as they are within the scope of the appended claims or the equivalents thereof.

What is claim is:

1. A beam spot position control device for controlling multiple beam spot positions irradiated onto an optical recording medium so as to be disposed linearly, said beam spot position control device comprising:
    optical detecting means for detecting the amount of return light for each of a plurality of beam spots disposed linearly;
    tracking control means for performing tracking control based on tracking error signals of at least one of the beam spots detected with the optical detecting means; and
    rotation control means for rotating the plurality of beam spots which are disposed linearly, based on the DC offset amount of the tracking error signals of at least two of the beam spots detected with the optical detecting means.

2. The beam spot position control device according to claim 1, wherein, in the case that the DC offset amount of a difference signal of the tracking error signals of at least two of the beam spots is at or above a given threshold value, the rotation control means rotate the plurality of beam spots which are disposed linearly.

3. The beam spot position control device according to claim 1, wherein, by rotating an optical system for generating the plurality of beam spots, the plurality of beam spots which are disposed linearly are rotated.

4. The beam spot position control device according to claim 1, wherein, by rotating a grating for splitting one beam into a plurality of beam spots, the plurality of beam spots which are disposed linearly are rotated.

5. A beam spot position control method for controlling multiple beam spot positions irradiated onto an optical recording medium so as to be disposed linearly, said method comprising:
    light detecting for detecting the amount of return light for each of a plurality of beam spots disposed linearly;
    tracking control for performing tracking control based on tracking error signals of at least one of the beam spots detected with the optical detecting process; and
    rotation control for rotating the plurality of beam spots which are disposed linearly, based on the DC offset amount of the tracking error signals of at least two of the beam spots detected with the optical detecting process.

6. An optical disk recording/reproducing device for recording and reproducing information to and from an optical disk, using a plurality of beam spots disposed linearly, said optical disk recording/reproducing device comprising:
    light irradiating means for irradiating a plurality of beam spots so as to be disposed linearly as to an optical disk;
    light detecting means for detecting the amount of returning light of each of the plurality of beam spots which are disposed linearly;
    tracking control means for performing tracking control, based on the tracking error signals of at least one beam spot detected with the light detecting means; and
    rotation control means for controlling the plurality of beam spots which are disposed linearly, based on the DC offset amount of the tracking error signals of at least two of the beam spots detected with the light detecting means.

7. The optical disk recording/reproducing device according to claim 6, wherein, in the case that the DC offset amount of a difference signal of the tracking error signals of at least two of the beam spots is at or above a given threshold value, the rotation control means rotate the plurality of beam spots which are disposed linearly.

8. The optical disk recording/reproducing device according to claim 6, wherein, by rotating an optical system for generating the plurality of beam spots, the rotation control means rotate the plurality of beam spots which are disposed linearly.

9. The optical disk recording/reproducing device according to claim 6, wherein, by rotating a grating for splitting one beam into a plurality of beam spots, the rotation control means rotate the plurality of beam spots which are disposed linearly.

10. An optical disk recording/reproducing device for recording and reproducing information as to an optical disk, using a plurality of beam spots disposed linearly, said an optical disk recording/reproducing device comprising:
    an optical system for generating a plurality of beam spots, and irradiating the plurality of beam spots so as to be disposed linearly as to an optical disk;
    a photodetector for detecting the amount of returning light of each of the plurality of beam spots which are disposed linearly;
    a tracking control mechanism for performing tracking control, based on the tracking error signals of at least one beam spot detected with the photodetector; and
    a rotation control mechanism for controlling the plurality of beam spots which are disposed linearly, based on the DC offset amount of the tracking error signals of at least two of the beam spots detected with the photodetector.

11. The optical disk recording and reproducing device according to claim 10, wherein, in the case that the DC offset amount of a difference signal of the tracking error signals of at least two of the beam spots is at or above a given threshold value, the rotation control mechanism rotates the plurality of beam spots which are disposed linearly.

12. The optical disk recording and reproducing device according to claim 10, wherein the optical system has at least two light sources, with the light axis of the light beams, in a state of being parallel to one another, which are emitted from each light source irradiated onto the optical disk so as to form a spot.

13. The optical disk recording and reproducing device according to claim 12, wherein, by rotating the positions of the light sources emitting the plurality of light beams, the rotation control mechanism rotates the plurality of beam spots which are disposed linearly.

14. The optical disk recording and reproducing device according to claim 10, wherein the optical system has a grating for splitting the light beams emitted from the light sources into a plurality of light beams, wherein the split light beams are each irradiated onto an optical disk so as to form a spot.

15. The optical disk recording and reproducing device according to claim 10, wherein, by rotating an optical system for generating the plurality of beam spots, the rotation control mechanism rotates the plurality of beam spots which are disposed linearly.

16. The optical disk recording and reproducing device according to claim 10, wherein, by rotating a grating for splitting one beam into a plurality of beam spots, the rotation control mechanism rotates the plurality of beam spots which are disposed linearly.

17. A beam spot position control device for controlling multiple beam spot positions irradiated onto an optical recording medium so as to be disposed linearly, said beam spot position control device comprising:
- a light detecting unit for detecting the amount of return light for each of a plurality of beam spots disposed linearly;
- a tracking control unit for performing tracking control based on tracking error signals of at least one of the beam spots detected with the optical detecting unit; and
- a rotation control unit for rotating the plurality of beam spots which are disposed linearly, based on the DC offset amount of the tracking error signals of at least two of the beam spots detected with the optical detecting unit.

18. An optical disk recording/reproducing device for recording and reproducing information as to an optical disk, using a plurality of beam spots disposed linearly, said optical disk recording/reproducing device comprising:
- a light irradiating unit for irradiating a plurality of beam spots so as to be disposed linearly as to an optical disk;
- a light detecting unit for detecting the amount of returning light of each of the plurality of beam spots which are disposed linearly;
- a tracking control unit for performing tracking control, based on the tracking error signals of at least one beam spot detected with the light detecting unit; and
- a rotation control unit for controlling the plurality of beam spots which are disposed linearly, based on the DC offset amount of the tracking error signals of at least two of the beam spots detected with the light detecting unit.

* * * * *